(12) United States Patent
Asano

(10) Patent No.: US 8,515,140 B2
(45) Date of Patent: Aug. 20, 2013

(54) REGISTRATION APPARATUS, VERIFICATION APPARATUS, REGISTRATION METHOD, VERIFICATION METHOD AND PROGRAM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1230 days.

(21) Appl. No.: 11/873,158

(22) Filed: Oct. 16, 2007

(65) Prior Publication Data

US 2008/0112645 A1 May 15, 2008

(30) Foreign Application Priority Data

Nov. 10, 2006 (JP) ................ P2006-305624

(51) Int. Cl.
- *G06K 9/00* (2006.01)
- *G06K 9/20* (2006.01)
- *G06K 9/32* (2006.01)

(52) U.S. Cl.
USPC ............ 382/124; 382/115; 382/283; 382/294

(58) Field of Classification Search
USPC ................. 382/115–118, 124, 126, 127, 313, 382/314, 315, 125, 283, 294; 340/5.53, 5.83, 340/5.82, 5.52, 356
See application file for complete search history.

(56) References Cited

U.S. PATENT DOCUMENTS

| | | | | |
|---|---|---|---|---|
| 4,607,384 A * | 8/1986 | Brooks | ......................... | 382/124 |
| 5,054,090 A * | 10/1991 | Knight et al. | ................. | 382/127 |
| 6,970,234 B2 * | 11/2005 | Nagasaka et al. | ............... | 356/71 |
| 7,245,745 B2 * | 7/2007 | Nagasaka et al. | ............. | 382/115 |
| 7,561,257 B2 * | 7/2009 | Nagasaka et al. | ............... | 356/71 |
| 7,609,864 B2 * | 10/2009 | Nagasaka et al. | ............. | 382/124 |
| 7,680,305 B2 * | 3/2010 | Miura et al. | ................... | 382/115 |
| 7,881,506 B2 * | 2/2011 | Nagasaka et al. | ............. | 382/124 |
| 7,903,847 B2 * | 3/2011 | Higuchi | ........................ | 382/126 |
| 2002/0048014 A1 * | 4/2002 | Kono et al. | ..................... | 356/71 |
| 2004/0184641 A1 * | 9/2004 | Nagasaka et al. | ............. | 382/124 |
| 2005/0047632 A1 | 3/2005 | Miura et al. | | |

(Continued)

FOREIGN PATENT DOCUMENTS

| | | |
|---|---|---|
| JP | 2005-71118 | 3/2005 |
| JP | 2005-157970 | 6/2005 |

(Continued)

OTHER PUBLICATIONS

Lin Hong; Jian, A.; Pankanti, S.; Bolle, R.; , "Fingerprint enhancement," Applications of Computer Vision, 1996. WACV '96., Proceedings 3rd IEEE Workshop on , vol., no., pp. 202-207, Dec. 2-4, 1996.*

Corresponding Japanese Patent Application No. JP 2006-305624; Office Action issued on May 24, 2011.

*Primary Examiner* — Andrae S Allison
(74) *Attorney, Agent, or Firm* — Finnegan, Henderson, Farabow, Garrett & Dunner, L.L.P.

(57) ABSTRACT

A registration apparatus includes: concealing means for concealing a part or whole of a verification area of an image generated by shooting a body part, the verification area being used for verification; production means for producing data for registration, the data representing a part or whole of a pattern of the verification area; display control means for controlling display means to display an image in which a part or whole of the verification area is concealed; and output switching means for outputting the image to the display control means or the production means.

7 Claims, 13 Drawing Sheets

(56) References Cited

U.S. PATENT DOCUMENTS

| | | | |
|---|---|---|---|
| 2006/0078176 A1* | 4/2006 | Abiko et al. | 382/124 |
| 2008/0040616 A1* | 2/2008 | Sato | 713/186 |
| 2009/0129635 A1* | 5/2009 | Abe | 382/115 |
| 2011/0026632 A1* | 2/2011 | Wight | 375/267 |

FOREIGN PATENT DOCUMENTS

| | | |
|---|---|---|
| JP | 2006-141589 | 6/2006 |
| JP | 2006-343995 | 12/2006 |
| WO | WO 2004/090814 A1 | 10/2004 |

* cited by examiner

REGISTRATION APPARATUS, VERIFICATION APPARATUS, REGISTRATION METHOD, VERIFICATION METHOD AND PROGRAM

CROSS REFERENCES TO RELATED APPLICATIONS

The present invention contains subject matter related to Japanese Patent Application JP2006-305624 filed in the Japanese Patent Office on Nov. 10, 2006, the entire contents of which being incorporated herein by reference.

BACKGROUND OF THE INVENTION

1. Field of the Invention

The present invention relates to a registration apparatus, verification apparatus, registration method, verification method and program, and is preferably applied to biometric identification, for example.

2. Description of the Related Art

One of physical characteristics for biometric identification is a blood vessel. An authentication apparatus for example takes a picture of a person's finger and then extracts from the image data a blood vessel pattern. The authentication apparatus subsequently compares the extracted blood vessel pattern with a registered blood vessel pattern to calculate a correlation value between the extracted pattern and the registered pattern. When the correlation value is greater than or equal to a predetermined threshold, the authentication apparatus determines that he/she is legitimate.

That kind of authentication apparatus is often equipped with a guide for a finger to be placed appropriately on an image-pickup position (see Jpn. Pat. Laid-open Publication No. 2005-71118, for example).

However, it seems better for the authentication apparatus not to have a guide in terms of design flexibility. Therefore, the authentication apparatus can be downsized.

Accordingly, there is an apparatus that replaces the guide with a display system, which displays a finger's image and a guide's image along with information regarding a distance between the finger's image and the guide's image (see Jpn. Pat. Laid-open Publication No. 2006-141589, for example).

SUMMARY OF THE INVENTION

However, since the above display system displays a blood vessel pattern, it can be easily stolen by someone else.

The present invention has been made in view of the above points and is intended to provide a registration apparatus, verification apparatus, registration method, verification method and program that prevent leaks of pattern data.

In one aspect of the present invention, a registration apparatus includes: concealing means for concealing a part or whole of a verification area of an image generated by shooting a body part, the verification area being used for verification; production means for producing data for registration, the data representing a part or whole of a pattern of the verification area; display control means for controlling display means to display an image in which a part or whole of the verification area is concealed; and output switching means for outputting the image to the display control means or the production means.

In another aspect of the present invention, a verification apparatus includes: concealing means for concealing a part or whole of a verification area of an image generated by shooting a body part, the verification area being used for verification; comparison means for comparing a part or whole of a pattern of the verification area with a part or whole of a pattern of a registered verification area; display control means for controlling display means to display an image in which a part or whole of the verification area is concealed; and output switching means for outputting the image to the display control means or the comparison means.

In another aspect of the present invention, a registration method includes: a first step of concealing a part or whole of a verification area of an image generated by shooting a body part, the verification area being used for verification; a second step of controlling display means to display an image in which a part or whole of the verification area is concealed; and a third step of stopping displaying the image in which a part or whole of the verification area is concealed or stopping updating the image displayed, and producing data for registration, the data representing a part or whole of a pattern of the verification area.

In another aspect of the present invention, a verification method includes: a first step of concealing a part or whole of a verification area of an image generated by shooting a body part, the verification area being used for verification; a second step of controlling display means to display an image in which a part or whole of the verification area is concealed; and a third step of stopping displaying the image in which a part or whole of the verification area is concealed or stopping updating the image displayed, and comparing a part or whole of a pattern of the verification area with a part or whole of a pattern of a registered verification area.

In another aspect of the present invention, a program for causing a computer to execute: a step of concealing a part or whole of a verification area of an image generated by shooting a body part, the verification area being used for verification; a step of controlling display means to display an image in which a part or whole of the verification area is concealed; and a step of stopping displaying the image in which a part or whole of the verification area is concealed or stopping updating the image displayed, and producing data for registration, the data representing a part or whole of a pattern of the verification area.

In another aspect of the present invention, a program for causing a computer to execute: a step of concealing a part or whole of a verification area of an image generated by shooting a body part, the verification area being used for verification; a step of controlling display means to display an image in which a part or whole of the verification area is concealed; and a step of stopping displaying the image in which a part or whole of the verification area is concealed or stopping updating the image displayed, and comparing a part or whole of a pattern of the verification area with a part or whole of a pattern of a registered verification area.

In that manner, they display a body part such that a part or whole of the verification area is concealed. This conceals the verification area while indicating the current position of a user's finger with respect to the target position in real time. Thus, the registration apparatus, the verification apparatus, the registration method, the verification method and the programs thereof can prevent leak of the pattern data of the verification area without being equipped with a physical guide section.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Overall Configuration of an Authentication Apparatus

Figure 1:
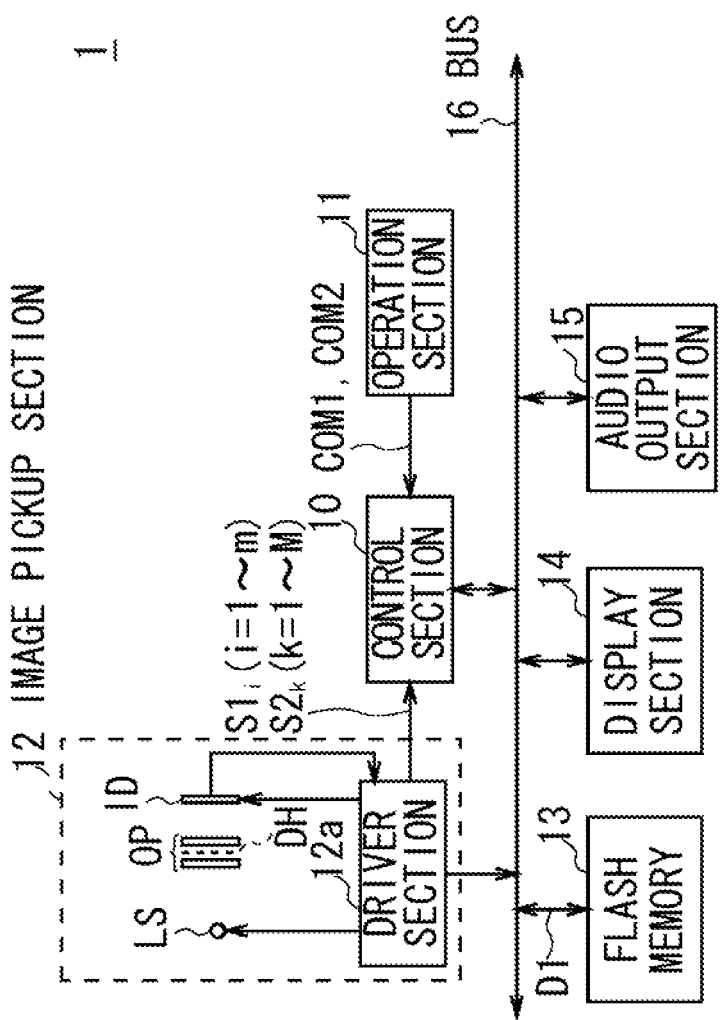
FIG. 1 is a block diagram illustrating the configuration of an authentication apparatus according to an embodiment of the present invention.

FIG. 1 illustrates the configuration of an authentication apparatus 1 according to an embodiment of the present invention. The authentication apparatus 1 includes a control section 10 connected to an operation section 11, an image pickup section 12, a flash memory 13, a display section 14 and an audio output section 15 via a bus 16.

The control section 10 is for example a microcomputer including; a Central Processing Unit (CPU), which takes overall control of the apparatus 1; a Read Only Memory (ROM), which stores various programs and setting information; and a Random Access Memory (RAM), which serves as a work memory for the CPU.

When operated by a user, the operation section 11 supplies to the control section 10 a command COM1, a command COM2 or the like: The command COM1 orders the control section 10 to operate in blood vessel registration mode for registering a user's blood vessel pattern while the command COM2 orders the control section 10 to operate in authentication mode for verifying a user.

After receiving the command COM1 or COM2, the control section 10 operates in the blood vessel registration mode or the authentication mode. In this case, the control section 10 executes a corresponding program to control the image pickup section 12, the flash memory 13, the display section 14 and the audio output section 15.

(1-1) Blood Vessel Registration Mode

When receiving the command for the blood vessel registration mode, the control section 10 enters the blood vessel registration mode and then starts controlling the image pickup section 12.

A driver section 12a of the image pickup section 12 turns on a near infrared ray source LS to emit a near infrared ray to a predetermined image pickup location. In addition, the drive section 12a controls an image pickup element ID.

The drive section 12a also adjusts the position of an optical lens, a part of the optical system OP, to focus on a subject. In addition, the driver section 12a adjusts an aperture DH based on an Exposure Value (EV) set by the control section 10. Moreover, the driver section 12a adjusts a shutter speed (exposure time) for the image pickup element ID.

The authentication apparatus 1 is designed to pick up an image of a finger. After a finger is placed on the image pickup position, the near infrared ray source LS emits a near infrared ray toward the finger. After being reflected and scattered inside the finger, the near infrared ray finally reaches the image pickup element ID, which receives it as a blood vessel reflection ray representing a blood vessel pattern of the finger. The image pickup element ID photo-electrically converts the blood vessel reflection ray at predetermined intervals into image signals $S1i$ ($i=1, 2, 3, \ldots$ and m (m: integer)), which are then supplied to the control section 10 via the driver section 12a.

When receiving a registration start command from the operation section 11, the control section 10 picks up, out of the image signals $S1i$, an image signal $S1m$ supplied from the image element ID at this time. The control section 10 subsequently extracts from the image signal $S1m$ a blood vessel pattern image and then stores the extracted blood vessel pattern image in the flash memory 13 as registration image data D1.

In that manner, the control section 10 operates in the blood vessel registration mode.

(1-2) Authentication Mode

When receiving the command for the authentication mode, the control section 10 enters the authentication mode and then starts controlling the image pickup section 12.

In similar way to the blood vessel registration mode, the image pickup section 12 adjusts the position of the optical lens of the optical system OP, the aperture DH based on the EV set by the control section 10, and the shutter speed for the image pickup element ID. Subsequently, the image pickup element ID supplies image signals $S2j$ ($j=1, 2, 3, \ldots$ and n (n: integer)) to the control section 10.

In the same way as the above blood vessel registration mode, the control section 10 extracts from the image signal $S2j$ a blood vessel pattern image and then compares it with the blood vessel pattern image of the registration image data D1 registered in the flash memory 13.

If the control section 10 recognizes, before a predetermined period of time has passed since start of the authentication mode, that a correlation value between those blood vessel pattern images is greater than or equal to a predetermined threshold, the control section 10 determines that the user is a legitimate registrant. In response to that, the control section 10 performs a predetermined process for the legitimate user and then ends the authentication mode.

Whereas if the control section 10 does not recognize, before the predetermined period of time has passed, that a correlation value between those blood vessel pattern images is greater than or equal to a predetermined threshold, the control section 10 determines that the user is not a legitimate registrant. In response to that, the control section 10 performs a predetermined process for the non-registered user and then ends the authentication mode.

In that manner, the control section 10 operates in the authentication mode.

(2) Process by the Control Section

Figure 2:
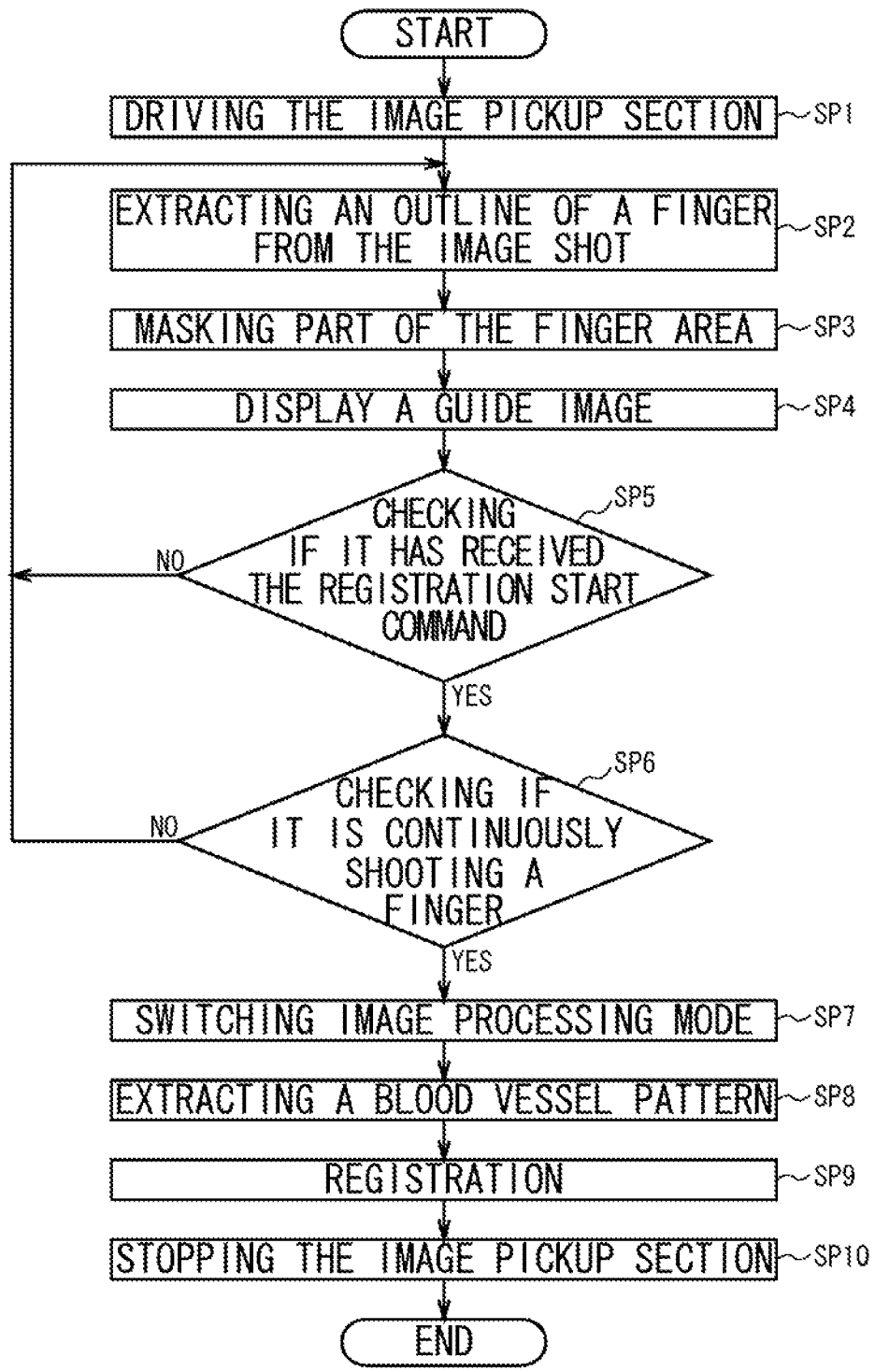
FIG. 2 is a flowchart illustrating a first registration process.

Following describes the process of the control section 10. The control section 10 of the authentication apparatus 1 performs either a first type of process or a second type of process.
(2-1) First Type Following describes a first type of process, which is performed by the control section 10, including a registration process (for the blood vessel registration mode) and an authentication process (for the authentication mode).
(2-1-1) Registration Process FIG. 2 is a flowchart illustrating a registration process (also referred to as a "first registration process"), which is performed by the control section 10 as the first type of process.

When receiving the blood vessel registration mode execution command COM1 (FIG. 1), the control section 10 starts the first registration process and then proceeds to step SP1. At step SP1, the control section 10 starts to control the image pickup section 12 (FIG. 1) and then proceeds to step SP2. At step SP2, the control section 10 performs a filtering process, such as Laplacian, to obtain an outline of a finger from the image signals S1$i$ (FIG. 1) supplied from the image pickup section 12 and then proceeds to step SP3.

At step SP3, the control section 10 masks an area inside the outline of the finger (also referred to as a "finger area") to make the blood vessels of the finger area substantially invisible.

Figure 3:
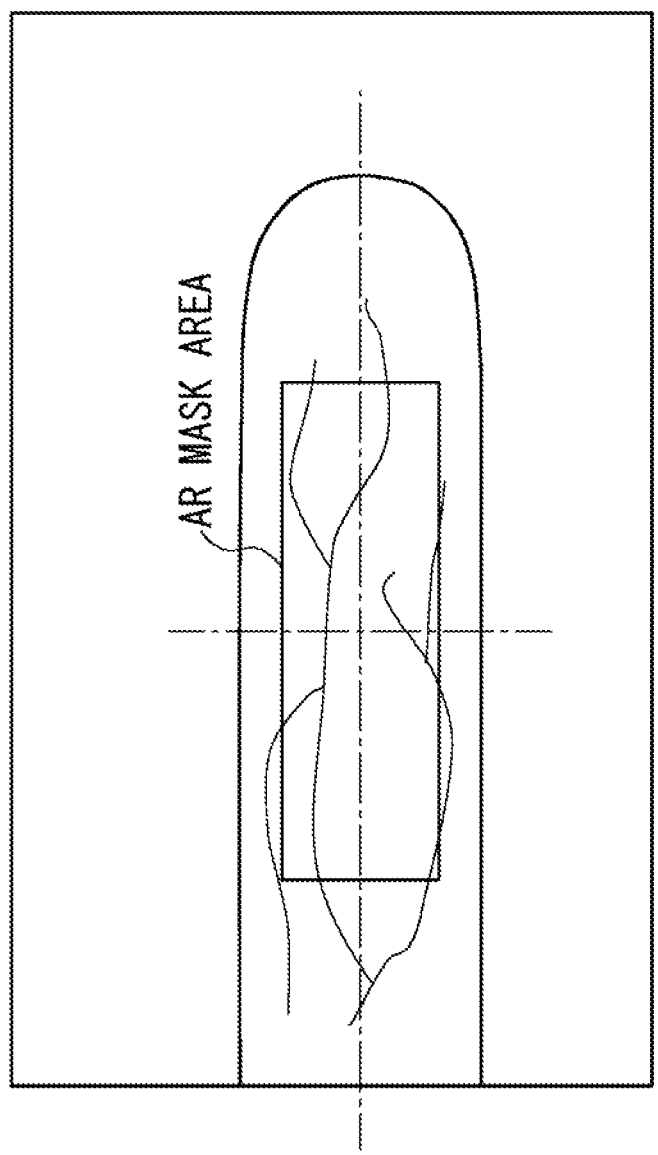
FIG. 3 is a schematic diagram illustrating setup of a mask area.

For example, as shown in FIG. 3, the control section 10 detects a center line extending along a longitudinal side of the finger outline and a center line extending along a shorter side of the finger outline. Based on these two center lines, the control section 10 puts a rectangular frame, whose center is a cross point of the two center lines, on the finger image as a mask area AR.

Subsequently, the control section 10 divides the mask area AR into x×y pixel blocks. The control section 10 calculates the average of luminance of each block and then applies it to each block so that the mask area AR becomes a mosaic.

At subsequent step SP4, the control section 10 combines the masked image data with a template that indicates where a finger should be placed on an image pickup surface. The control section 10 displays a resultant guide display screen on the display section 14 (FIG. 1).

For example, the control section 10 displays on the display section 14 (FIG. 1) a guide display screen including an finger area image FM1$i$, which has a mask covering the blood vessel patterns, and a T-shaped guide mark image GM1, which indicates where the tip and center of a finger should be placed on the image pickup surface.

At subsequent step SP5, the control section 10 checks if it has received a registration start command from the operation section 11 (FIG. 1). If the control section 10 has received the registration start command from the operation section 11, the control section 10 proceeds to step SP6. At step SP6, the control section 10 checks if the authentication apparatus 1 is continuously taking a picture of the finger, by confirming that it is still obtaining the finger outlines from the image signals S1$i$, which have been supplied since it received the registration start command.

If the control section 10 recognizes that it has not received the registration start command or that it is not continuously taking a picture of the finger (even after receiving the registration start command), the control section 10 returns to step SP2 and retries the process.

In that manner, while continuously shooting the finger, the control section 10 keeps displaying the guide mark GM1 and the finger area image FM1$i$, which is updated each time an image of the finger is shot, until it receives the registration start command. Accordingly, the guide mark GM1 helps the finger to be placed appropriately at a predetermined image pickup position while the finger area image FM1$i$ prevents people from recognizing the blood vessel patterns.

On the other hand, if the control section 10 recognizes that it has received the registration start command and that it is continuously shooting the finger, the control section 10 proceeds to step SP7. At step SP7, the control section 10 changes its image processing mode from a mask processing mode, which is started at step SP3, to a blood vessel pattern extraction processing mode. At the same time, the control section 10 stops displaying the guide display screen or stops updating the finger area image FM1$i$. At subsequent step SP8, the control section 10 extracts a blood vessel pattern image from the image data of the finger outline by performing a smoothing process, a binarization process and a thinning process and then proceeds to step SP9.

At step SP9, the control section 10 stores (registers) the blood vessel pattern image in the flash memory 13 (FIG. 1) as the registration image data D1 and then proceeds to step SP10. At step SP10, the control section 10 stops operating the image pickup section 12 (FIG. 1) to end the first registration process.

Figure 5:
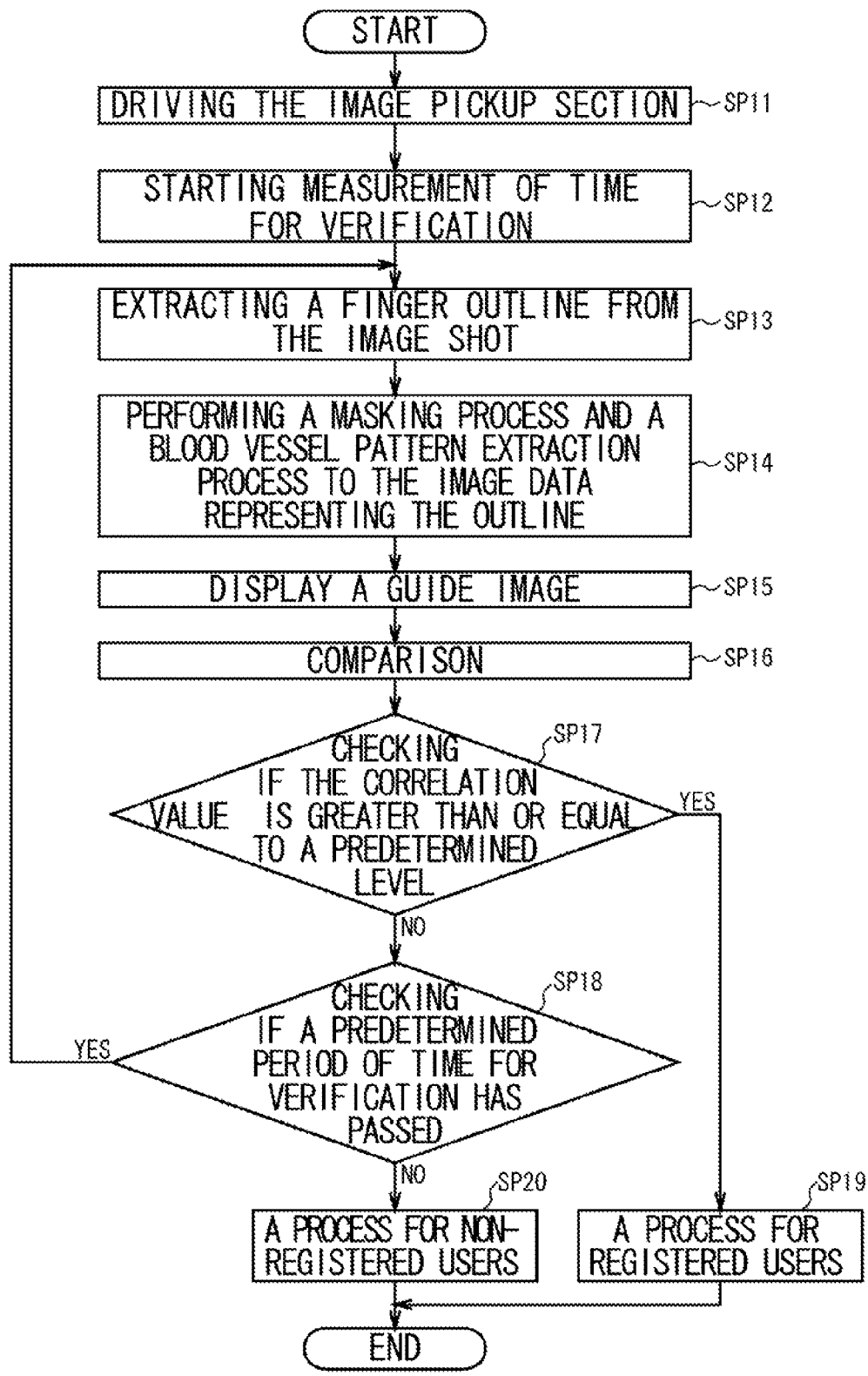
FIG. 5 is a flowchart illustrating a first authentication process.

In that manner, the control section 10 performs the first registration process.
(2-1-2) Authentication Process FIG. 5 is a flowchart illustrating an authentication process (also referred to as a "first authentication process"), which is performed by the control section 10 as the first type of process.

When receiving the authentication mode execution command COM2 (FIG. 1), the control section 10 starts the first authentication process and proceeds to step SP11. At step SP11, the control section 10 starts operating the image pickup section 12 (FIG. 1) and then proceeds to step SP12. The control section 10 at step SP12 starts measuring time to check if a predetermined period of time for comparison (verification) has passed. The control section 10 subsequently proceeds to step SP13.

At step SP13, the control section 10 extracts an outline of a finger from the image signals S2$j$ (FIG. 1) supplied from the image pickup section 12 by performing a predetermined filtering process. At subsequent step SP14, the control section 10 performs the masking process and blood vessel pattern extraction process (which are the same as the first registration process) for the extracted outline image.

At subsequent step SP15, the control section 10 combines the masked image data with the registration image data D1 (FIG. 1) registered in the flash memory 13 (FIG. 1) to generate a guide display screen, which is then displayed on the display section 14 (FIG. 1).

Figure 6:
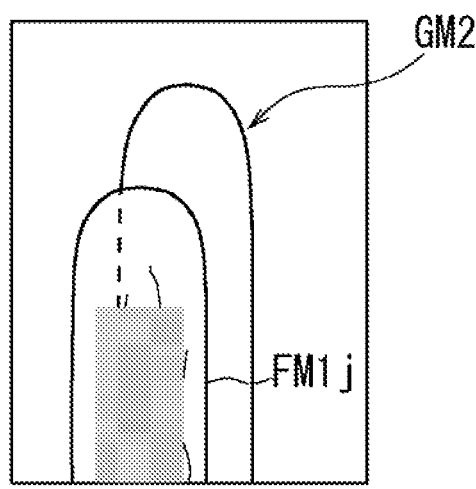
FIG. 6 is a schematic diagram illustrating a guide display screen (2)

For example, as shown in FIG. 6, the control section 10 displays on the display section 14 (FIG. 1) a guide display screen including a finger area image FM1$j$, which has a mask covering the blood vessel pattern of a target finger, and a guide mark GM2, which represents the outline of a finger to show the position of the finger when it was registered.

At subsequent step SP16, the control section 10 compares the image data of the extracted blood vessel pattern (obtained at step SP14) with that of the registration image data D1 (FIG.

1) registered in the flash memory 13 (FIG. 1) and then proceeds to step SP17. The control section 10 at step SP17 checks if a correlation value between those images is greater than or equal to a predetermined threshold.

If the correlation value between those images is less than the threshold, the control section 10 proceeds to step SP18 and then checks if the predetermined period of time for comparison has passed. If that period has not passed yet, the control section 10 returns to step SP13 and then retries the above process.

In that manner, the control section 10 keeps displaying the guide mark GM2 and the finger area image FM1j, which is updated each time an image of the finger is shot, until the predetermined period of time for comparison has passed. Accordingly, the guide mark GM2 helps the finger to be placed appropriately at the same position as when the finger was registered, while the finger area image FM1j prevents people from recognizing the blood vessel patterns.

If the control section 10 recognizes, before the predetermined period of time for comparison has passed, that the correlation value between those images is greater than or equal to the threshold, the control section 10 determines that the user is legitimate. In this case, the control section 10 proceeds to step SP19 to perform a process for registered legitimate users: the control section 10 for example lifts restriction on some operation modes, which were prohibited from being performed, and then informs the user accordingly through the display section 14 (FIG. 1) and the audio output section 15 (FIG. 1). The control section 10 subsequently ends the authentication process.

Whereas if the control section 10 does not recognize, before the predetermined period of time for comparison has passed, that the correlation value between those images is greater than or equal to the threshold, the control section 10 determines that the user is not legitimate. In this case, the control section 10 proceeds to step SP20 to perform a process for non-registered users: the control section 10 notifies the user of the fact that he/she is not a legitimate user registered in the authentication apparatus 1 through the display section 14 (FIG. 1) and the audio output section 15 (FIG. 1). The control section 10 subsequently ends the authentication process.

In that manner, the control section 10 performs the first authentication process.

(2-1-3) Operation and Effect of the First-Type Process

Following describes the operation and effect regarding the first type of process. The authentication apparatus 1 masks part of the finger image, which is to be registered, with a mosaic; this part of the finger image includes the blood vessel pattern.

Figure 4:
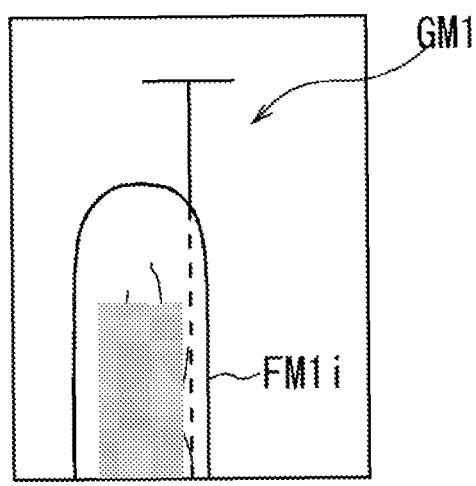
FIG. 4 is a schematic diagram illustrating a guide display screen (1)

When operating in the blood vessel registration mode, the authentication apparatus 1 displays the T-shaped guide mark GM1 indicating where the tip and center of a finger should be placed and the finger area image FM1i including a mask covering the blood vessel pattern which is to be registered (FIG. 4).

On the other hand, when operating in the authentication mode, the authentication apparatus 1 displays the guide mark GM2 having a finger-outline shape for indicating the position of the finger when it was shot for registration and the finger area image FM1j including a mask covering the blood vessel pattern which corresponds to the part registered (FIG. 6).

In that manner, the authentication apparatus 1 conceals the blood vessel patterns. In addition, the authentication apparatus 1 helps a user understand where he/she is putting his/her finger. The user can understand the current position of his/her finger with respect to the target. Accordingly, the authentication apparatus 1 does not have to have a physical component for guiding fingers. In addition, the authentication apparatus 1 prevents information regarding blood vessel patterns from being leaked.

Moreover, the authentication apparatus 1 displays the T-shaped guide mark GM to help a user register his/her finger, the T-shaped guide mark GM indicating where the tip and center of the finger should be placed. Accordingly, everyone can appropriately put their fingers although the length and width of fingers differ for each individual. The authentication apparatus 1 also displays another guide mark GM for authentication, this guide mark GM representing an outline of a finger to indicate the image pickup position (where a finger should be placed for authentication) that is the same as that of the registration mode. This helps a user to put his/her finger on the right position.

(2-1-4) Other Examples of the First-Type Process

In the above-noted first-type process, a concealing means performs a masking process to set the mosaic mask area AR (FIG. 3). However, the present invention is not limited to this. The apparatus may perform another masking process, such as transforming the mask area AR (FIG. 3) into a radial pattern or a stripe pattern, replacing a block with another block, putting noise over the area AR, replacing the area image AR with another image, or the like to make the mask area AR substantially invisible. The apparatus may perform several types of masking processes at once.

Moreover, in the above-noted first-type process, the center of the finger is concealed as the mask area AR. However, the present invention is not limited to this. Instead, the entire surface of the finger or other parts of the finger may be concealed.

Figure 7:
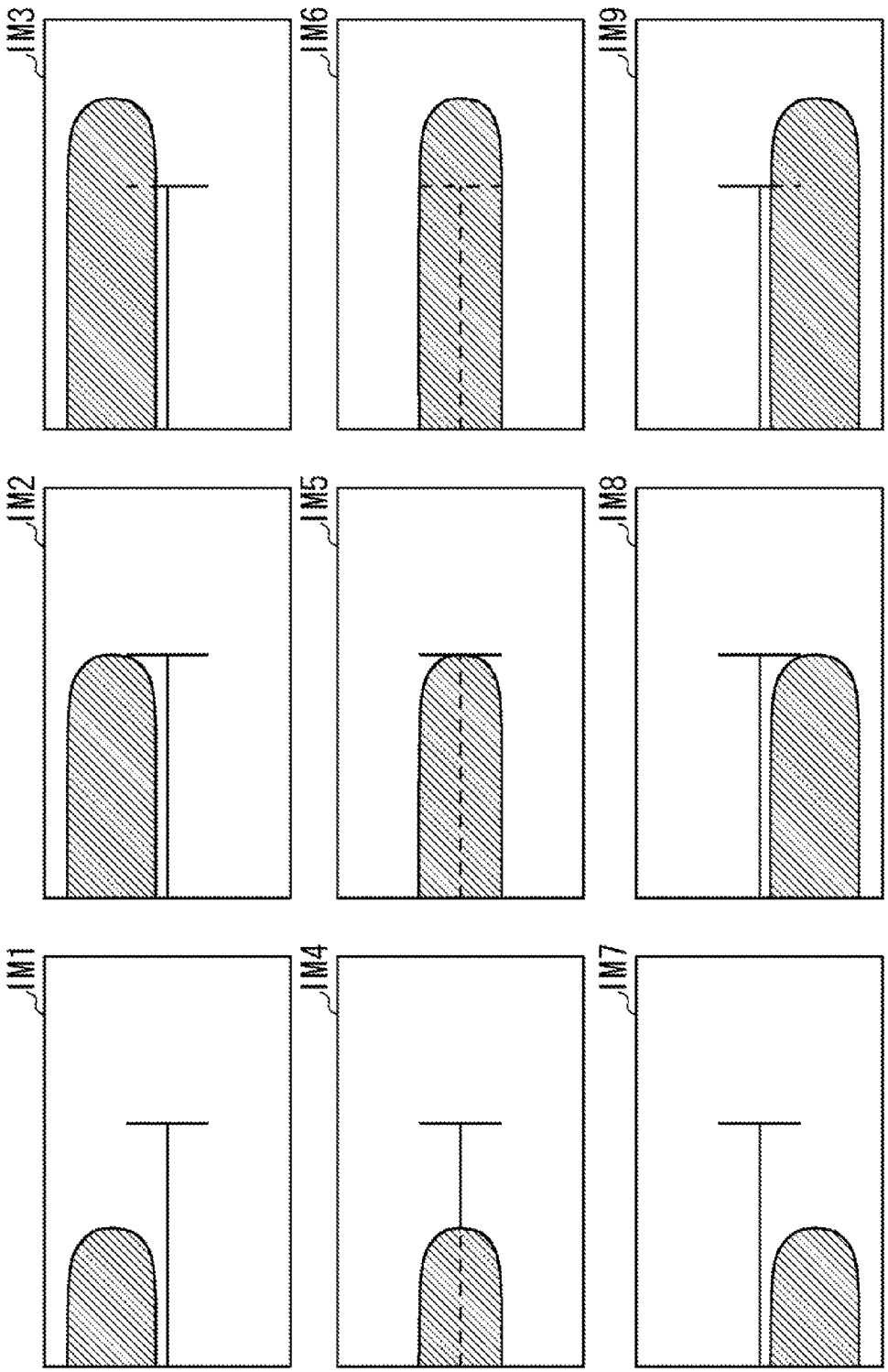
FIG. 7 is a schematic diagram illustrating an example of template images.

Furthermore, instead of performing the masking process, the apparatus may use images IM1 to IM9 (FIG. 7), which look like an outline of a finger on the image pickup surface, as templates: The apparatus may choose one of the images IM1 to IM9 (pre-stored in the ROM or the like) whose outline is similar to the result of the outline extraction process and then combines it with another template or the registration image data D1. This helps reduce processing load regarding step SP4 (FIG. 2) of the blood vessel registration mode and step SP15 (FIG. 5) of the authentication mode.

Furthermore, in the above-noted first-type process, the apparatus is designed to display the T-shaped guide mark GM1 to indicate where the tip and center of a finger should be placed. However, the present invention is not limited to this. The apparatus may display differently-shaped guide marks. Alternatively, the apparatus may use a template having a guide mark and a background representing the actual circumstance for a finger to be placed. This provides a user with a realistic feeling. Accordingly, the apparatus is easy-to-use.

Furthermore, in the above-noted first-type process, the apparatus displays on the display section 14 the guide display screen generated by combining the masked image and the template (which is an image indicating where a finger should be placed). However, the present invention is not limited to this. Alternatively, the apparatus may display on the display section 14 the masked image as a guide display screen.

In that case, the center (image pickup position) of the masked image and this image's finger area (i.e. the masked area AR of a body part) help a user understand the current position of his/her finger with respect to the target position. In this manner, the apparatus can guide the user's finger.

By the way, if the apparatus is equipped with a physical guide section to indicate where a finger should be placed, the image shot by the image pickup section 12 may show the guide section as well as a finger. In this case, after masking that image, the apparatus only displays this masked image because it shows a body part (finger) whose blood vessel pattern has been concealed and the target position where a finger should be placed. Accordingly, this method can present the same effect as the above-noted first-type process.

Furthermore, in the above-noted first-type process, the apparatus is designed to display images to indicate the position where a finger should be placed and the current position of the finger. In addition to that, the apparatus may display an indicator to indicate whether the condition for shooting is good or bad.

There is a possibility that a finger at a predetermined position of the authentication apparatus 1 is too much illuminated for shooting due to the conditions. In this case, the blood vessel pattern images shot may differ for the registration mode and the authentication mode even if the finger was placed at the same position. Accordingly, displaying the indicator helps a user correct it himself/herself. Thus, the apparatus is easy-to-user.

Another method to solve the above problem is to equip the apparatus with a physical cover that covers around a finger at the image pickup position and shuts off light from the outside. However, this increases the complexity of the apparatus. In addition, the apparatus cannot be easily downsized. Accordingly, the indicator is more effective than the physical cover.

Following describes an example of how the apparatus displays the indicator. After the outline extraction process (step SP2 (FIG. 2) or step SP13 (FIG. 5)) to extract an outline of a finger, the control section 10 calculates values regarding the brightness (such as brightness distribution and brightness average) of the finger area of the image representing the extracted outline.

The control section 10 subsequently checks which one of the following ranges the calculated values belong to: a first range, which is defined as a good shooting condition; a second range, which is defined as a not-so-good-but-not-so-bad shooting condition; and a third range, which is defined as a bad shooting condition.

When it determines the shooting condition is bad, this means that the variability of illumination for a finger is significant. In this case, as the variability of illumination increases, the brightness distribution will be leveled off while the brightness average will increase.

When the calculated values are within the first range, the control section 10 at step SP3 or SP14 performs a strong masking process to make it substantially invisible. When the calculated values are within the second range, the control section 10 at step SP3 or SP14 performs a relatively weaker masking process which still makes it substantially invisible. When the calculated values are within the third range, the control section 10 at step SP3 or SP14 performs a weaker masking process which allows a user to see it, or does not perform a masking process.

In this manner, the apparatus presents a strong mask or a weak mask as the indicator. If a user does not recognize the effect of masking, he/she can estimate that the current condition is good for shooting. Whereas if a user recognizes the effect of masking, he/she can estimate that the current condition is bad for shooting.

Figure 8A:
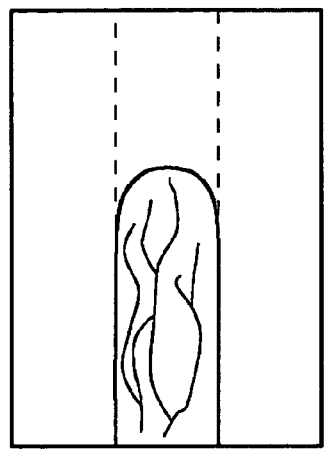
FIGS. 8A to 8C are schematic diagrams illustrating fake blood vessel patterns to be attached to a finger area.
Figure 8B:
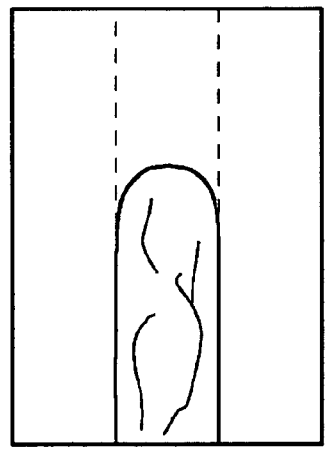
Figure 8C:
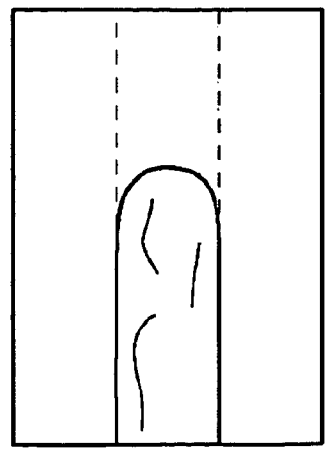

If the apparatus is designed to display the template images IM (FIG. 7) instead of masking, the control section 10 at step SP3 or SP14 attaches, when the calculated values are within the first range, a fake blood vessel pattern image including many lines (FIG. 8A) to the image IM whose outline is similar to the result of the outline extraction process. When the calculated values are within the second range, the control section 10 attaches a fake blood vessel pattern image including not-so-many lines (FIG. 8B) to the image IM. When the calculated values are within the third range, the control section 10 attaches a fake blood vessel pattern image including a few lines (FIG. 8C) to the image IM.

In that manner, the number of lines of the fake blood vessel pattern images represents whether the shooting condition is good or bad. When there are many lines, a user may determine that the shooting condition is good. When there are a few lines, a user may determine that the shooting condition is bad.

By the way, in the above case, the shooting condition is evaluated based on the values of brightness inside the finger image. Alternatively, the shooting condition may be evaluated based on the number of blood vessels in the image. On the other hand, the evaluation of the shooting condition is expressed by the level of masking or by the number of lines of the fake blood vessel pattern images. Alternatively, the evaluation may be expressed in a massage such as "The current condition for shooting is . . . "

In that manner, the number of blood vessels inside the finger area of the image (which represents the extracted outline of the finger) is simply evaluated based on the values of brightness on a scale of 0 to n. And the authentication apparatus 1 displays the evaluation. Accordingly, a user can recognize the shooting condition in real time. That is, a user can recognize that the shooting condition sometimes may not be good enough for shooting even if he/she put his/her finger appropriately, and therefore could refrain from starting registration. Thus, the authentication apparatus 1 is easy-to-use.

(2-2) Second Type

The following describes the second type of process. In the second type of process, the authentication apparatus 1 uses a near infrared ray to shoot blood vessels. In this case, the blood vessel pattern is concealed by shooting a finger under the condition in which the apparatus stops emitting the near infrared ray to the finger. This method is different from that of the first-type process that masks the blood vessel pattern. A second-type registration process (blood vessel registration mode) and authentication process (authentication mode) by the control section 10 will be described in detail.

(2-2-1) Registration Process

Figure 9:
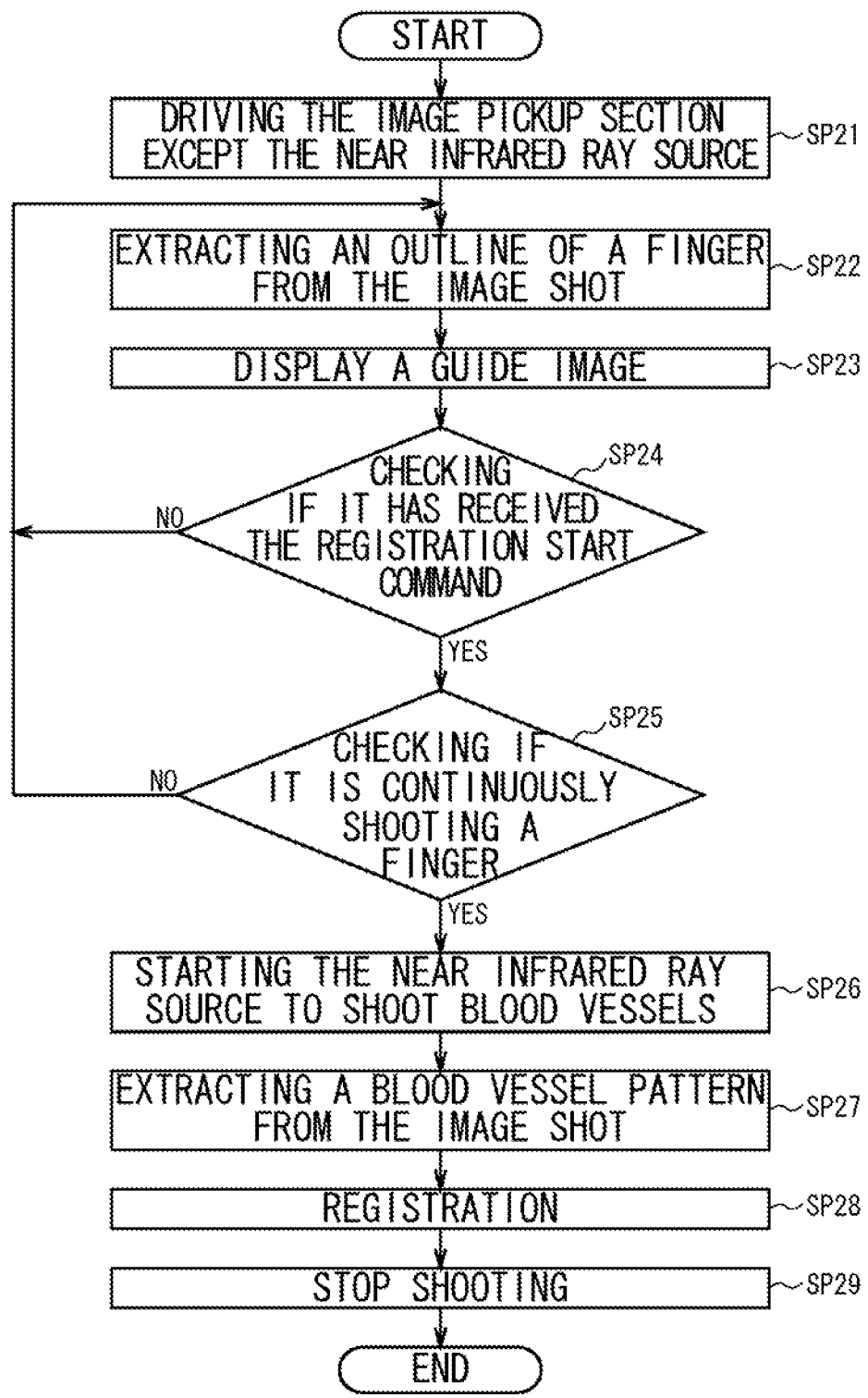
FIG. 9 is a flowchart illustrating a second registration process.

FIG. 9 is a flowchart illustrating the second-type registration process (also referred to as a "second registration process") by the control section 10.

When receiving the blood vessel registration mode execution command COM1 (FIG. 1), the control section 10 starts the second registration process and then proceeds to step SP21. At step SP21, the control section 10 starts driving the image pickup section 12 (FIG. 1) but the near infrared ray source LS (FIG. 1) is not started yet.

Figure 10A:
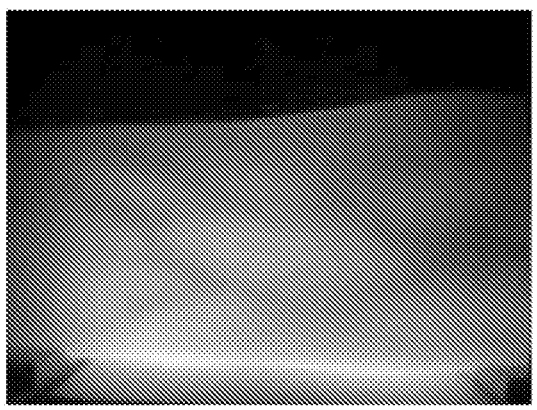
FIGS. 10A and 10B are schematic diagrams illustrating an image shot when a near infrared ray or visible ray is used for shooting.

The near infrared rays are particularly absorbed by hemoglobin in the blood vessels. As a result of emitting the near infrared rays to a finger, the rays received by the image pickup section 12 represent the pattern of the blood vessels of the finger, and FIG. 10A is the image shot by the image pickup section 12.

Figure 10B:
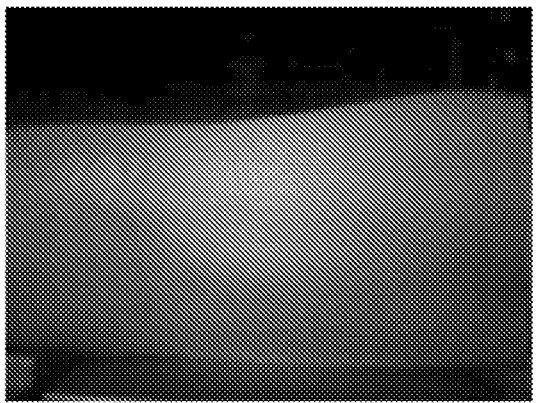

On the other hand, when not emitting the near infrared rays to a finger, the image pickup section 12 just receives visible rays representing the finger, and FIG. 10B is the image shot by the image pickup section 12. In that manner, when the control section 10 is driving the image pickup section 12 except the near infrared ray source LS (FIG. 1), the blood vessel pattern area of the image shot by the image pickup section 12 is concealed completely.

Figure 11:
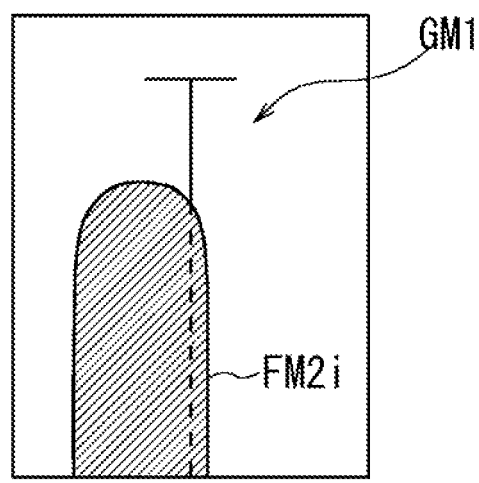
FIG. 11 is a schematic diagram illustrating a guide display screen (3)

In a similar way to the above first registration process, the control section 10 at subsequent step SP22 extracts an outline of the finger from the image shot. At subsequent step SP23, the control section 10 displays on the display section 14 (FIG. 1) a guide display screen including a finger area FM2i, which is surrounded by the outline, and the T-shaped guide mark GM1, which indicates where the tip and center of the finger should be placed on the image pickup screen, as shown in FIG. 11.

At subsequent step SP24, the control section 10 checks if it has received from the operation section (FIG. 1) the registration start command. If the control section 10 has received the registration start command from the operation section 11, the control section 10 proceeds to step SP25. At step SP25, the control section 10 checks if the authentication apparatus 1 is continuously shooting the finger, by confirming that it is still obtaining the finger outlines from the image signals S1$i$, which have been supplied since it received the registration start command.

If the control section 10 recognizes that it has not received the registration start command or that it is not continuously shooting the finger (even after receiving the registration start command), the control section 10 returns to step SP22 and retries the process.

In that manner, while continuously shooting the finger, the control section 10 keeps displaying the guide mark GM1 and the finger area image FM2$i$, which is updated each time an image of the finger is shot, until it receives the registration start command. Accordingly, the guide mark GM1 helps the finger to be placed appropriately at a predetermined image pickup position while the finger area image FM2$i$ prevents people from recognizing the blood vessel patterns.

On the other hand, if the control section 10 recognizes that it has received the registration start command, the control section 10 proceeds to step SP26 and starts driving the near infrared ray source LS to take a picture of the blood vessels of the finger. In addition, the control section 10 stops displaying the guide display screen or stops updating the finger area image FM2$i$ on the guide display screen, and then proceeds to step SP27.

At step SP27, the control section 10 extracts the blood vessel pattern from the image data representing the extracted outline of the finger, by for example performing a smoothing process, a binarization process and a thinning process, and then proceeds to step SP28.

At step SP28, the control section 10 stores (or registers) the blood vessel pattern image in the flash memory 13 (FIG. 1) as the registration image data D1 and then proceeds to step SP29. At step SP29, the control section 10 stops the image pickup section 12 (FIG. 1) to end the second registration process.

In that manner, the control section 10 performs the second registration process.

(2-2-2) Authentication Process

Figure 12:
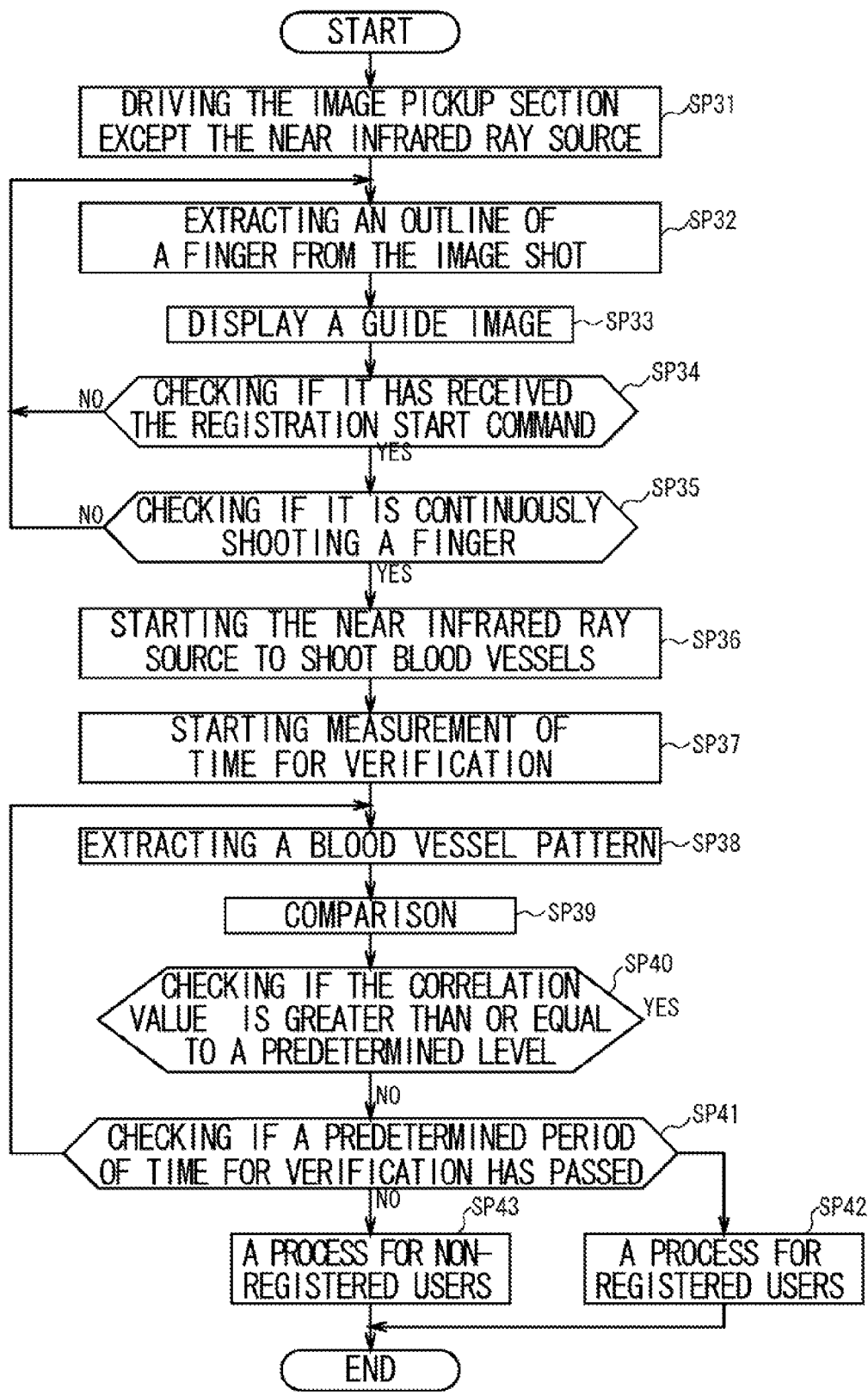
FIG. 12 is a flowchart illustrating a second authentication process.

FIG. 12 is a flowchart illustrating the second-type authentication process (also referred to as a "second authentication process) by the control section 10.

Figure 13:
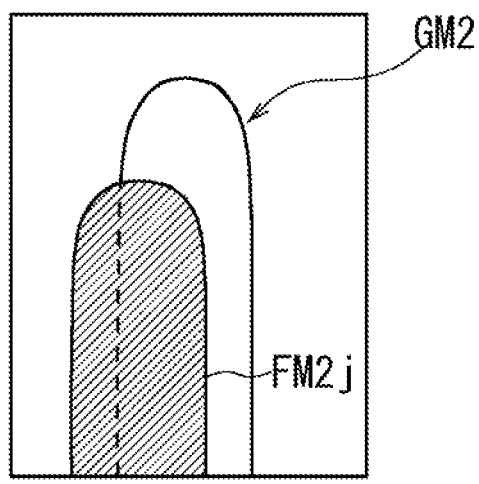
FIG. 13 is a schematic diagram illustrating a guide display screen (4).

When receiving the authentication mode execution command COM2 (FIG. 1), the control section 10 starts the second authentication process. In a similar way to the above second registration process, the control section 10 at subsequent step SP31 starts driving the image pickup section 12 (FIG. 1), but the near infrared ray source LS (FIG. 1) is not started yet. At subsequent step SP32, the control section 10 extracts an outline of a finger from an image shot by the image pickup section 12 and then proceeds to step SP33. At step SP33, the control section 10 displays on the display section 14 (FIG. 1) a guide display screen including a finger area FM2$j$, which is surrounded by the finger's outline, and the guide mark GM2, which represents the outline of the finger to indicate the image pickup position where the finger was once placed for registration, as shown in FIG. 13.

At subsequent step SP34, the control section 10 checks if it has received a verification start command from the operation section (FIG. 1). If the control section 10 has received the verification start command from the operation section 11, the control section 10 proceeds to step SP35. At step SP35, the control section 10 checks if the authentication apparatus 1 is continuously shooting the finger, by confirming that it is still obtaining the finger outlines from the image signals S21, which have been supplied since it received the verification start command.

If the control section 10 recognizes that it has not received the verification start command or that it is not continuously shooting the finger (even after receiving the verification start command), the control section 10 returns to step SP32 and retries the process.

In that manner, while continuously shooting the finger, the control section 10 does not start the verification process until it receives the verification start command. Instead the control section 10 keeps displaying the guide mark GM2 and the finger area image FM2$j$, which is updated each time an image of the finger is shot. Accordingly, the guide mark GM2 helps the finger to be placed appropriately at a predetermined image pickup position while the finger area image FM2$j$ prevents people from recognizing the blood vessel patterns.

On the other hand, if the control section 10 recognizes that it has received the verification start command, the control section 10 proceeds to step SP36 and starts driving the near infrared ray source LS to take a picture of the blood vessels of the finger. At subsequent step SP37, the control section 10 starts measuring time to check if a predetermined period of time for comparison (verification) has passed. The control section 10 subsequently proceeds to step SP38.

At step SP38, the control section 10 extracts a blood vessel pattern of the finger from the image signals S2$j$ (FIG. 1) supplied from the image pickup section 12 by for example performing a smoothing process, a binarization process and a thinning process. At subsequent step SP39, the control section 10 compares the extracted blood vessel pattern with that of the registration image data D1 (FIG. 1) registered in the flash memory 13 (FIG. 1). At subsequent step SP40, the control section 10 checks if a correlation value between those images is greater than or equal to a predetermined threshold.

If the correlation value between those images is less than the threshold, the control section 10 proceeds to step SP41 and then checks if the predetermined period of time for comparison has passed. If that period has not passed yet, the control section 10 returns to step SP38 and then repeats the above process until that period has passed.

If the control section 10 recognizes, before the predetermined period of time for comparison has passed, that the correlation value between those images is greater than or equal to the threshold, the control section 10 determines that the user is legitimate. In this case, the control section 10 proceeds to step SP42 to perform a process for registered legitimate users: the control section 10 for example lifts restriction on some operation modes, which were prohibited from being performed, and then informs the user accordingly through the display section 14 (FIG. 1) and the audio output section 15 (FIG. 1). The control section 10 subsequently ends the authentication process.

Whereas if the control section 10 does not recognize, before the predetermined period of time for comparison has passed, that the correlation value between those images is greater than or equal to the threshold, the control section 10 determines that the user is not legitimate. In this case, the control section 10 proceeds to step SP43 to perform a process for non-registered users: the control section 10 notifies the user of the fact that he/she is not a legitimate user registered in the authentication apparatus 1 through the display section 14 (FIG. 1) and the audio output section 15 (FIG. 1). The control section 10 subsequently ends the authentication process.

In that manner, the control section 10 performs the second authentication process.

(2-2-3) Operation and Effect of the Second-Type Process

Following describes the operation and effect regarding the second type of process. The authentication apparatus 1 starts driving the image pickup section 12 (FIG. 1) except the near infrared ray source LS (FIG. 1). The authentication apparatus 1 does not start the near infrared ray source LS until it receives the registration or verification start command from the operation section 11 (FIG. 1).

When operating in the blood vessel registration mode, the authentication apparatus 1 turns off the near infrared ray source LS to conceal the blood vessel pattern of the finger area FM2*i* of the image shot. The authentication apparatus 1 displays this image and the T-shaped guide mark GM1 indicating where the tip and center of a finger should be placed, which are updated each time an image of the finger is shot (FIG. 9).

When operating in the authentication mode, the authentication apparatus 1 turns off the near infrared ray source LS to conceal the blood vessel pattern of the finger area FM2*i* of the image shot. The authentication apparatus 1 displays this image and the guide mark GM2 representing the outline of the finger to indicate the image pickup position where the finger was once placed for registration, which are updated each time an image of the finger is shot (FIG. 11).

The authentication apparatus 1 therefore conceal the blood vessel patterns in a similar way to the first-type process. In addition, a user can recognize the position of his/her finger with respect to the target position in real time.

Moreover, the second-type process does not perform an image processing process (masking process) while the first registration process does. This reduces processing load. Furthermore, the second-type process is designed to turn off the near infrared ray source LS. The authentication apparatus 1 therefore consumes lower amounts of power.

(2-2-4) Other Examples of the Second-Type Process

In the above-noted second-type process, the apparatus is designed to display the T-shaped guide mark GM1 to indicate where the tip and center of a finger should be placed. However the present invention is not limited to this. The apparatus may display differently-shaped guide marks. Alternatively, the apparatus may use a template having a guide mark and a background representing the actual circumstance for a finger to be placed. This provides a user with a realistic feeling. Accordingly, the apparatus is easy-to-use.

Moreover, in the above-noted second-type process, the guide display screen, displayed on the display section 14, is generated by combining the image, whose blood vessel pattern of the finger area FM2*i* has been concealed as a result of turning off the near infrared ray source LS, and the template image, which indicates where the tip and center of a finger should be placed. However, the present invention is not limited to this. In a similar way to the first-type process, the guide display screen, displayed on the display section 14, may only include the image whose blood vessel pattern of the finger area FM2*i* has been concealed.

Furthermore, in the above-noted second-type process, the apparatus is designed to display images to indicate the position where a finger should be placed and the current position of the finger. In addition to that, the apparatus may display an indicator to indicate whether the condition for shooting is good or bad, in a similar way to the first-type process.

Following describes an example of how the apparatus displays the indicator. After the outline extraction process (step SP22 (FIG. 9) or step SP32 (FIG. 12)) to extract an outline of a finger, the control section 10 calculates values regarding the brightness (such as brightness distribution and brightness average) of the finger area of the image representing the extracted outline. The control section 10 subsequently checks which one of the following ranges the calculated values belong to: the first range, the second range and the third range.

When the calculated values are within the first range, the control section 10 at step SP23 or SP33 attaches a fake blood vessel pattern image including many lines (FIG. 8A) to the image. When the calculated values are within the second range, the control section 10 attaches a fake blood vessel pattern image including not-so-many lines (FIG. 8B) to the image. When the calculated values are within the third range, the control section 10 attaches a fake blood vessel pattern image including a few lines (FIG. 8C) to the image.

By the way, in the above case, the shooting condition is evaluated based on the values of brightness inside the finger image. Alternatively, the shooting condition may be evaluated based on the number of blood vessels in the image. On the other hand, the evaluation of the shooting condition is expressed by the level of masking or by the number of lines of the fake blood vessel pattern images. Alternatively, the evaluation may be expressed in a massage such as "The current condition for shooting is . . . ".

In that manner, the number of blood vessels inside the finger area of the image (which represents the extracted outline of the finger) is simply evaluated based on the values of brightness on a scale of 0 to n. And the authentication apparatus 1 displays the evaluation. Accordingly, a user can recognize the shooting condition in real time. That is, a user can recognize that the shooting condition sometimes may not be good enough for shooting even if he/she put his/her finger appropriately, and therefore could refrain from starting registration. Thus, the authentication apparatus 1 is easy-to-use.

(3) Other Embodiments

In the above-noted embodiment, a biometric trait to be verified is a blood vessel pattern. However, the present invention is not limited to this. Biometric traits for verification may include other physiological trait patterns, such as fingerprints, mouth's pattern (wrinkles), nerve fibers or the like. By the way, in the above-noted embodiment, the blood vessel pattern is extracted from an image of fingers. However, the present invention is not limited to this. The blood vessel pattern may be extracted from an image of palms, arms or the like.

Moreover, in the above-noted embodiment, the control section 10 reads out a program from the ROM and then loads it onto the RAM to execute it. The control section 10 therefore operates in the blood vessel registration mode and the authentication mode. However, the present invention is not limited to this. The program may be installed from a storage medium, such as Compact Disc (CD), Digital Versatile Disc (DVD) and semiconductor memories, or may be acquired via the Internet.

Furthermore, in the above-noted embodiment, the control section 10 performs the registration and authentication processes. However, the present invention is not limited to this. A graphics work station may perform part of the process.

Furthermore, in the above-noted embodiment, there is the authentication apparatus 1 that includes the image pickup function, the verification function and the registration function. However, the present invention is not limited to this.

There may be a plurality of apparatus, each of which includes a different one of the above functions.

The above method can be applied to biometrics verification.

It should be understood by those skilled in the art that various modifications, combinations, sub-combinations and alterations may occur depending on design requirements and other factors insofar as they are within the scope of the appended claims or the equivalents thereof.

What is claimed is:

1. A registration apparatus comprising:
   a central processing unit (CPU);
   a concealing unit, performed by the CPU, concealing a part or whole of a verification area of an image generated by shooting a body part, the verification area being used for verification;
   a production unit, performed by the CPU, producing data for registration, the data representing a part or whole of a pattern of the verification area;
   a display control unit, performed by the CPU, controlling a display means to display the image in which the part or whole of the verification area is concealed; and
   an output switching unit, performed by the CPU, outputting the image to the display control unit or the production unit,
   wherein the image is a first image, and
   the display control unit controls the display means to display a second image generated by combining the first image in which a part or whole of the verification area is concealed, position data indicating where the body part should be placed on an image pickup surface, and a background image representing an actual circumstance for the body part to be placed.

2. The registration apparatus of claim 1, wherein:
   the concealing unit includes:
   an outline extraction section extracting an outline of the body part from the image generated by shooting the body part; and
   an image processing section masking a part or whole of an area within the outline to make the part or whole of the area substantially invisible.

3. The registration apparatus of claim 2, further comprising:
   an evaluation unit evaluating a shooting condition according to a brightness state of the area or a number of objects in the verification area, wherein
   the image processing section masks the part or whole of the area to make the part or whole of the area substantially invisible if the evaluation unit determines that the brightness state of the area is lower than a predetermined level, or the image processing section masks the part or whole of the area in a way that the part or whole of the area is visible if the evaluation unit determines that the brightness state of the area is greater than a predetermined level.

4. The registration apparatus according to claim 1, wherein:
   the concealing unit conceals the part or whole of a verification area of the image generated by shooting the body part by controlling the stopping and starting of a near infrared ray source directed at the body part, wherein the near infrared ray source is configured to generate at least a portion of the image.

5. A registration apparatus comprising:
   a central processing unit (CPU);
   a concealing unit, performed by the CPU, concealing a part or whole of a verification area of an image generated by shooting a body part, the verification area being used for verification, wherein the concealing unit includes:
   an outline extraction section for extracting an outline of the body part from the image generated by shooting the body part; and
   an image processing section masking a part or whole of an area within the outline to make the part or whole of the area substantially invisible;
   a production unit, performed by the CPU, producing data for registration, the data representing a part or whole of a pattern of the verification area;
   a display control unit, performed by the CPU, controlling a display means to display the image in which the part or whole of the verification area is concealed;
   an output switching unit, performed by the CPU, outputting the image of the display control unit or the production unit; and
   an evaluation unit for evaluating a shooting condition according to a brightness state of the area or a number of objects in the verification area, wherein
   the image processing section masks the part or whole of the area to make the part or whole of the area substantially invisible if the evaluation unit determines that the brightness state of the area is lower than a predetermined level, or the image processing section masks the part or whole of the area in a way that the part or whole of the area is visible if the evaluation unit determines that the brightness state of the area is greater than a predetermined level.

6. The registration apparatus according to claim 5, wherein:
   the image is a first image; and
   the display control unit controls the display means to display a second image generated by combining the first image in which a part or whole of the verification area is concealed and position data indicating where the body part should be placed on an image pickup surface.

7. The registration apparatus according to claim 5, wherein:
   the image is a first image; and
   the display control unit controls the display means to display a second image generated by combining the first image in which a part or whole of the verification area is concealed, position data indicating where the body part should be placed on an image pickup surface, and a background image representing an actual circumstance for the body part to be placed.

* * * * *